United States Patent
West (10) Patent No.: US 11,280,880 B2
(45) Date of Patent: Mar. 22, 2022

(54) SINGLE CHANNEL DUAL ORTHOGONAL LINEAR POLARIZATION ARRAY

(71) Applicant: Rockwell Collins, Inc., Cedar Rapids, IA (US)

(72) Inventor: James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 144 days.

(21) Appl. No.: 16/690,991

(22) Filed: Nov. 21, 2019

(65) Prior Publication Data

US 2021/0318410 A1  Oct. 14, 2021

(51) Int. Cl.
| | |
|---|---|
| *G01S 7/02* | (2006.01) |
| *G01S 13/95* | (2006.01) |
| *H01Q 3/24* | (2006.01) |
| *H01Q 21/00* | (2006.01) |
| *H01Q 21/24* | (2006.01) |
| *G01S 13/00* | (2006.01) |

(52) U.S. Cl.
CPC ............ *G01S 7/025* (2013.01); *G01S 13/951* (2013.01); *H01Q 3/24* (2013.01); *H01Q 21/0025* (2013.01); *H01Q 21/245* (2013.01)

(58) Field of Classification Search
CPC ... G01S 7/025; G01S 13/951; H01Q 21/0025; H01Q 21/245; H01Q 3/24
See application file for complete search history.

(56) References Cited

U.S. PATENT DOCUMENTS

| | | | | |
|---|---|---|---|---|
| 3,093,824 | A | * | 6/1963 | Ammerman ............. H04B 7/10 342/365 |
| 4,979,170 | A | | 12/1990 | Gilhousen et al. |
| 5,038,150 | A | * | 8/1991 | Bains .................. H01Q 25/001 342/373 |
| 6,388,997 | B1 | | 5/2002 | Scott |
| 7,358,912 | B1 | * | 4/2008 | Kish ..................... H01Q 3/242 343/725 |
| 8,098,189 | B1 | * | 1/2012 | Woodell ................ G01S 13/953 342/26 R |
| 9,094,102 | B2 | | 7/2015 | Corman et al. |
| 9,182,485 | B1 | * | 11/2015 | Andrews ............... G01S 13/951 |

(Continued)

OTHER PUBLICATIONS

Extended Search Report for European Application No. 20209311.8 dated Apr. 26, 2021, 10 pages.

(Continued)

*Primary Examiner* — Bernarr E Gregory
(74) *Attorney, Agent, or Firm* — Suiter Swantz pc llo (57) ABSTRACT

A radar system includes an electronically scanned array of dual orthogonal linearly polarized radiating elements. Each of the radiating elements is fed by a switch driven by a radar processing unit. The switch successively places each radiation element in a vertically polarized configuration and horizontally polarized configuration so that the antenna can transmit and receive both vertically and horizontally polarized images within the radar epoch/pulse timing sequence of the radar system. The vertically polarized image and horizontally polarized image are sufficiently close in time to be collated to form a multi-dimensional image. The switch may be driven at rates other than the radar system clock as dictated by algorithms for detecting weather related threats.

15 Claims, 4 Drawing Sheets

(56) References Cited

U.S. PATENT DOCUMENTS

2015/0234035 A1* 8/2015 Lohoefener ........... G01S 13/953
                                                                         343/702
2019/0246402 A1    8/2019 Negus et al.
2020/0365998 A1* 11/2020 Gleason ............... H01Q 21/065

OTHER PUBLICATIONS

Khandelwal N et al: "Active Antenna Module for Low-Cost Electronically Scanned Phased Arrays", IEEE Transactions on Microwave Theory and Techniques, Plenum, USA, vol. 56, No. 10, Oct. 1, 2008 (Oct. 1, 2008), pp. 2286-2292, XP011235160, ISSN: 0018-9480, DOI: 10.1109/TMTT.2008.2003122 * figure 3 *.
Salazar Jorge L et al: "T/R modules for active phased array radars", 2015 IEEE Radar Conference (Radarcon), IEEE, May 10, 2015 (May 10, 2015), pp. 1125-1133, XP032788265, DOI: 10.1109/RADAR.2015.7131163 [retrieved on Jun. 22, 2015] *figure 1c*.
Vivekanandan Jothi Ram et al: "Airborne Polarimetric Doppler Weather Radar: Antenna Aperture and Beam Forming Architecture", 2019 IEEE International Symposium on Phased Array System & Technology (PAST), IEEE, Oct. 15, 2019 (Oct. 15, 2019), pp. 1-6, XP033732237, DOI: 10.1109/PAST43306.2019.9020932 [retrieved on Mar. 2, 2020]* figure 8 *.

* cited by examiner

SINGLE CHANNEL DUAL ORTHOGONAL LINEAR POLARIZATION ARRAY

BACKGROUND

Radar, specifically weather radar, utilizes polarization to identify and measure weather events. Dual polarization is desirable for multiple dimensions of the event. A more complete image can be created by combining images from multiple polarizations if the images are contemporaneous.

Ground-based weather radars are generally dish based radar with channels dedicated to each polarized signal. Existing mobile electronically scanned arrays (ESAs) are designed to be compact and robust, and generally only operate with a single channel. A multi-channel, mobile ESA system, suitable for dual orthogonal linear polarization would be prohibitively expensive and complicated. Single channel ESAs adapted for serial capture of polarized images in different dimensions cannot capture images sufficiently close in time to produce a single collated image of multiple dimensions.

Therefore, there is a need for low-cost dual orthogonal linear polarized systems suitable for inclusion in a mobile platform.

SUMMARY

In one aspect, embodiments of the inventive concepts disclosed herein are directed to a radar system having an electronically scanned array of dual orthogonal linearly polarized radiating elements. Each of the radiating elements is fed by a switch driven by the radar-processor. The switch successively places each radiation element in a vertically polarized configuration and horizontally polarized configuration so that the antenna can transmit and receive both vertically and horizontally polarized images within the pulse epoch of the radar system. The polarization switch can switch much faster than the radar waveform timing requirements. Different radar waveforms and timing sequences with initiate different polarization state change switching speeds with a multi-mode radar system. The vertically polarized image and horizontally polarized image are sufficiently close in time to be collated to form a multi-dimensional image.

In a further aspect, the switch may be driven at rates other than the radar system clock as dictated by multi-mode waveform requirements. Different algorithms for detecting weather related threats may be optimized at different imaging rates. Altering the switch rate provide differently polarized images at any desired rate.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a radar system having an electronically scanned array of dual orthogonal linearly polarized radiating elements. Each of the radiating elements is fed by a switch driven by a radar processing unit. The switch successively places each radiation element in a vertically polarized configuration and horizontally polarized configuration so that the antenna can transmit and receive both vertically and horizontally polarized images.

Figure 1:
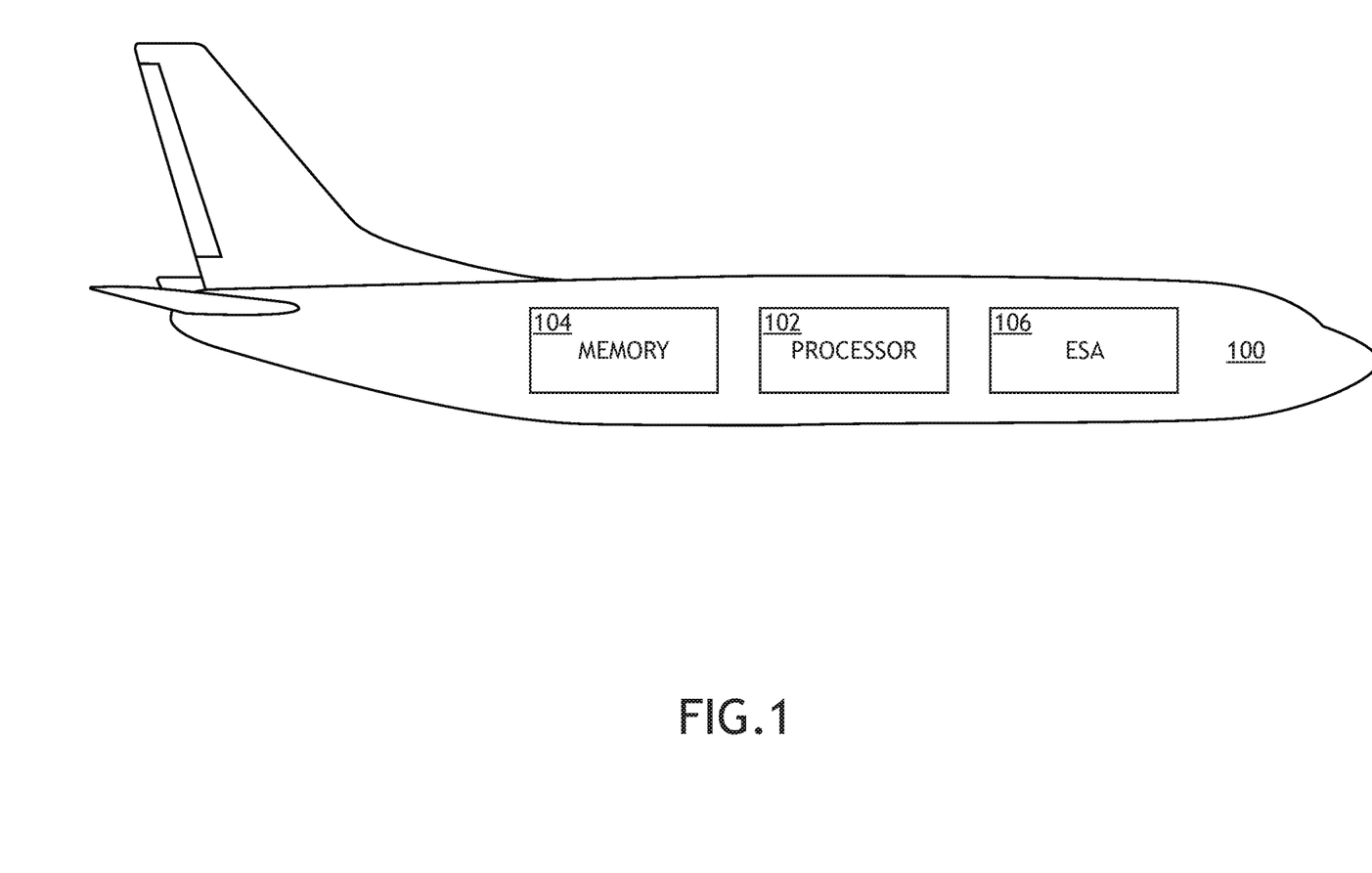
FIG. 1 shows a block diagram of a mobile platform including an exemplary embodiment of an electronically scanned array radar system.

Referring to FIG. 1, a block diagram of a mobile platform 100 including an exemplary embodiment of an electronically scanned array radar system is shown. A mobile platform 100, such as an aircraft, includes a radar processing unit 102, memory 104 connected to the radar processing unit 102 for embodying processor executable code, and an electronically scanned array (ESA) 106. The ESA 106 comprises dual orthogonal linearly polarized radiating elements. Each radiating element is fed through a switch. The switch feeds the radiating elements in either a vertically polarized configuration or a horizontally polarized configuration. Such switching may be controlled by a processor clock cycle or synchronization within the radar pulse epoch.

In at least one embodiment, the switch may also switch the radiating element from a transmit mode to a receive mode. By controlling the switching of the radiating elements among their modes and configurations of operation, the ESA 106 may transmit and receive in both horizontal polarization and vertical polarization sufficiently fast to be compatible for the radar waveform, pulse timing sequence of the radar processing unit 102. Such operation is sufficiently fast to allow the horizontal polarization and vertical polarization to be combined contemporaneously.

Figure 2:
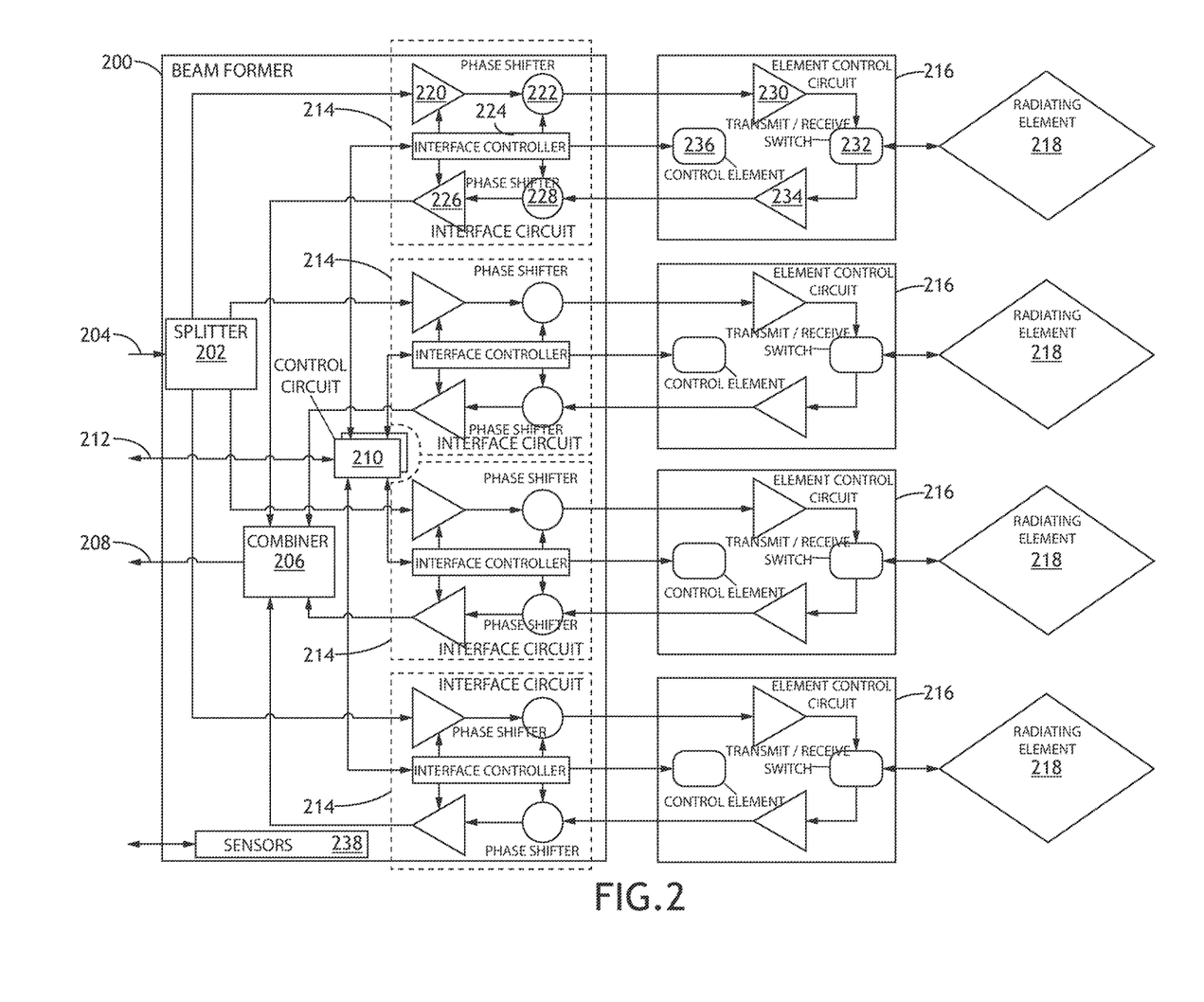
FIG. 2 shows a block diagram of a beam forming network for an electronically scanned array.

Referring to FIG. 2, a block diagram of a beam forming network for an electronically scanned array is shown. A beam former 200 includes a passive transmit splitter 202 that receives a transmission signal 204 for distribution to individual interface circuits 214, and a passive receiver combiner 206 for receiving signals from the individual interface circuits 214 to produce an output signal 208. The beam former 200 includes digital control circuitry 210 that receives one or more signal groups 212 for distribution to the individual interface circuits 214, and receive feedback from the individual interface circuits 214. It may be appreciated that splitters 202 and combiners 206 may be implemented by active frequency integrated circuits.

In a transmit mode, each individual interface circuit 214 supplies signals to a corresponding antenna element control circuit 216 that directly applies signals to a corresponding radiating element 218. Each individual interface circuit 214 includes a variable gain input amplifier 220 that receives a signal from the passive transmit splitter 202, and an input phase shifter 222 that supplies signals to the corresponding individual interface circuit 214. The variable gain input amplifier 220 and input phase shifter 222 are controlled by an interface circuit controller 224 that may alter the gain of the variable gain input amplifier 220 and the phase shift of the signal from the input phase shifter 222 according to a signal group 212 from the digital control circuitry 210 such that radiating elements 218 together produce a far field radiation pattern that result from the constructive and destructive combining of the radiated RF signal. In at least one embodiment, phase shift circuits can be replaced by time delay units for Ultra-Broad Band AESA systems.

In a receive mode, each individual interface circuit 214 receives signals from the corresponding antenna element control circuit 216. Each individual interface circuit 214 includes a variable gain output amplifier 226 that supplies a signal to the passive receiver combiner 206, and an output phase shifter 228 that receives signals from the corresponding individual interface circuit 214. The variable gain output amplifier 226 and output phase shifter 228 are controlled by the interface circuit controller 224 that may alter the phase shift and gain of the received signal based on a known directionality of the received signal.

Each antenna element control circuit 216 includes a power amplifier 230 that receives a signal from the input phase shifter 222 and supplies the signal to a transmit/receive switch 232 that directly supplies the signal to a corresponding radiating element 218 in a transmit mode. Weather radar systems are ½ Duplexed systems, which means the transmit/receive switch 232 toggles the radar between transmit and receive modes. The transmit/receive switch 232 may be embedded within a TRM RFIC, Multi-Chip Module, RF System in Package, or other similar technology. The transmit/receive switch 232 receives a signal from the corresponding radiating element 218 in a receive mode, and delivers the signal to a low noise amplifier 234, that delivers an amplified output signal to the output phase shifter 228. A control element 236 receives signals from the interface circuit controller 224 and places the transmit/receive switch 232 in a transmit mode or receive mode according to the signals. It may be appreciated that in some embodiments, the order of signal processing may be reversed such that the signal is phase shifted via the input phase shifter 222, and then the signal is amplified via the variable gain amplifier 220. Likewise, a received signal may be amplified via the variable gain output amplifier 226 and then phase shifted via the output phase shifter 228.

The beam former 200 may include various sensors 238 for monitoring and communicating the state of the beam former 200 and antenna generally.

A system such as in FIG. 2 generally only allows for polarization in a single dimension defined by the directional polarization of the radiating elements 218. Dual polarization would require two such systems operating in parallel.

Figure 3:
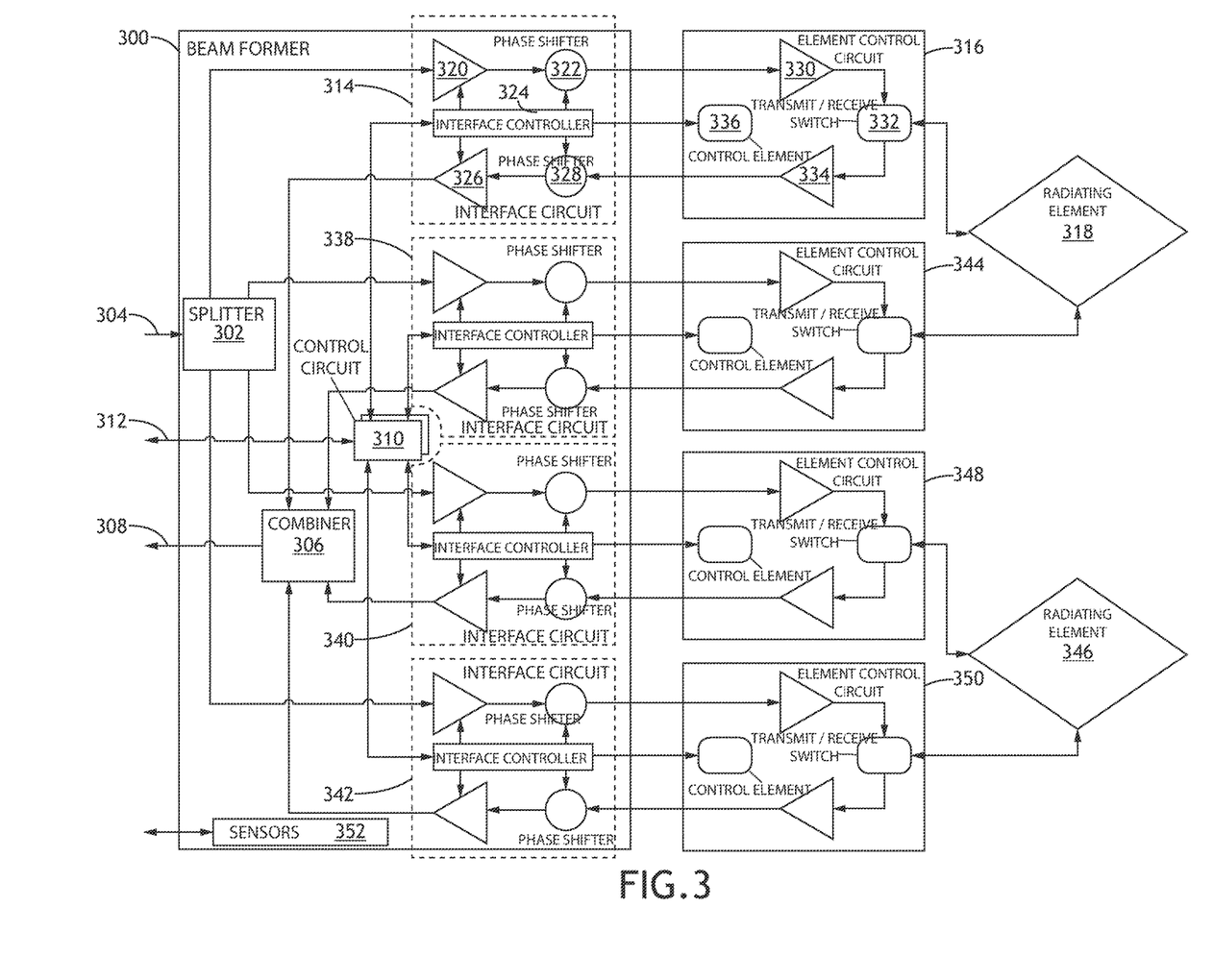
FIG. 3 shows a block diagram of a circuit for feeding an electronically scanned array.

Referring to FIG. 3, a block diagram of a beamformer for an electronically scanned array is shown. Similar to the system shown in FIG. 2, the beam former 300 includes a passive transmit splitter 302 and a passive receiver combiner 306 for transmitting and receiving transmission signals 304 and output signal 308. Digital control circuitry 310 configures individual interface circuits 314, 338, 340, 342 according to one or more signal groups 312. The beam former 300 may include various sensors 352 for monitoring and communicating the state of the beam former 300 and antenna generally.

Each individual interface circuit 314, 338, 340, 342 supplies and receives signals to and from a corresponding antenna element control circuit 316, 344, 348, 350 and radiating element 318, 346 via a variable gain input amplifier 320 and input phase shifter 322 in a transmit mode, or a variable gain output amplifier 326 and output phase shifter 328 in a receive mode. Each individual interface circuit element 314, 338, 340, 342 is controlled via the interface circuit controller 324.

It may be appreciated that in some embodiments, the order of signal processing may be reversed such that the signal is phase shifted via the input phase shifter 322, and then the signal is amplified via the variable gain amplifier

320. Likewise, a received signal may be amplified via the variable gain output amplifier 326 and then phase shifted via the output phase shifter 328.

Each antenna element control circuit 316, 344, 348, 350 includes a power amplifier 330 and a low noise amplifier 334, each connected to a transmit/receive switch 332 for placing the radiating element 318, 346 in a transmit mode or receive mode via a control element 336 according to signal groups from the digital control circuitry 310.

The radiating element 318, 346 is addressable for either horizontal polarization or vertical polarization. A system such as in FIG. 3 generally allows for polarization in dual dimensions as defined by the directional polarization of the radiating elements 318, 346. Dual polarization requires twice the number of RF channels relative to systems such as in FIG. 1. A first radiating element 318 is driven in a horizontal polarization configuration by a first antenna element control circuit 316, controlled by a first individual interface circuit 314, and driven in a vertical polarization configuration by a second antenna element control circuit 344, controlled by a second individual interface circuit 338. Likewise, a second radiating element 346 is driven in a horizontal polarization configuration by a third antenna element control circuit 348, controlled by a third individual interface circuit 340, and driven in a vertical polarization configuration by a fourth antenna element control circuit 350, controlled by a fourth individual interface circuit 342.

Such as system operates with half the number of available radiating elements 318, 346 or double the necessary control circuitry (four channels driving two radiating elements 318, 346). Channel capacity is thereby halved with a corresponding penalty in size, weight, power, and cost.

Figure 4:
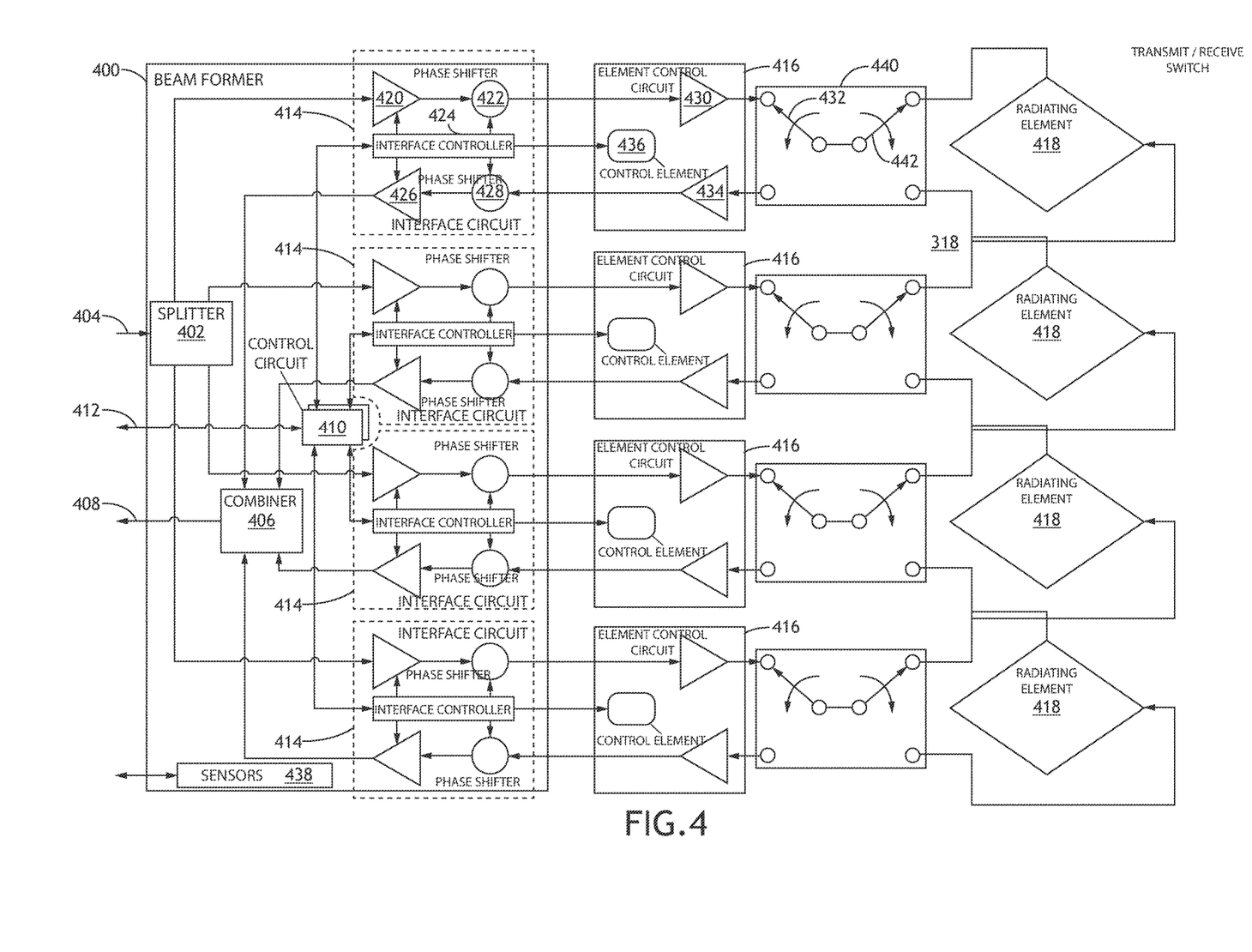
FIG. 4 shows a block diagram of a circuit for feeding an electronically scanned array according to an exemplary embodiment.

Referring to FIG. 4, a block diagram of a beam former for an electronically scanned array according to an exemplary embodiment is shown. Similar to the system shown in FIG. 3, the beam former 400 includes a passive transmit splitter 402 and a passive receiver combiner 406 for transmitting and receiving transmission signals 404 and output signal 408. Digital control circuitry 410 configures individual interface circuits 414 according to one or more signal groups 412. The beam former 400 may include various sensors 438 for monitoring and communicating the state of the beam former 400 and antenna generally.

Each individual interface circuit 414 supplies and receives signals to and from a corresponding antenna element control circuit 416 and radiating element 418 via a variable gain input amplifier 420 and input phase shifter 422 in a transmit mode, or a variable gain output amplifier 426 and output phase shifter 428 in a receive mode. Each individual interface circuit 414 element is controlled via the interface circuit controller 424.

Each antenna element control circuit 416 includes a power amplifier 430 and a low noise amplifier 434, each connected to a dual switching element 440 having a transmit/receive switch 432 for placing the radiating element 418 in a transmit mode or receive mode, and a polarization switch 442. The radiating element 418 is addressable for either horizontal polarization or vertical polarization based on a pole of the radiating element 418 where the signal is applied, defined by the polarization switch 442. The polarization switch 442 may be controlled by the control element 436 according to signal groups from the digital control circuitry 410.

In at least one embodiment, the dual switching element 440 incorporates a "ganged-dual mode," simultaneously driving the corresponding radiating element 418 in ½ duplex transmit/receive modes with time division multiplexed polarization modes. It may be appreciated that the hardware enabled by the fast switching of the dual switching element 440 is generally applicable to beam former networks, including digital beam formers. In another embodiment, dual switching element 440 is integrated into the antenna control unit 416, for example, embodiments as a monolithic RF integrated circuit.

The combination of vertical polarization and horizontal polarization (collectively, dual polarization) is useful for rain, hail, snow, ice, clutter, debris (volcanic ash, dust, foreign objects and particulates, etc.) and biological (e.g. "birds") detection. For example, large raindrops or hailstones are detectable via a logarithm of the ratio of power returned from a horizontally polarized pulse versus a vertically polarized pulse (differential reflectivity). Such comparison requires time coincident measurements. Time coincident, full polarimetric dual orthogonal linearly polarized radar requires:

Vertical polarization for both transmission and reception
Horizontal polarization for both transmission and reception
Vertical polarization for transmission and horizontal polarization for reception
Horizontal polarization for transmission and vertical polarization for reception In at least one embodiment, the transmit/receive switch 432 and polarization switch 442 each comprise a field effect transistor with switching speed at or less than ten psecs; such switching speed is several orders of magnitudes faster than required to retain correlation intervals sufficiently fast for parametric weather radar. For example, the transmit/receive switch 432 and polarization switch 442 may comprise X band PIN (P doped—Intrinsic region, N-doped) diodes or devices other than FET transistors such as RFIC devices. By switching the transmit/receive switch 432 and polarization switch 442 in various combinations, all of the necessary polarization combinations can be achieved. With sufficiently fast switching, the return signals may be treated as time invariant within a correlation interval.

Meteorological radar targets are volumetric in nature and thus their radar cross-section properties are significantly different as compared to those of interest within the defense and intelligence communities, e.g., aircraft, maritime vessels, and land vehicles. Typically, the correlation interval time of meteorological related targets of interest are in the tens or hundreds of milliseconds, or even larger. If timed division multiplexed vertical and horizontal polarized radar returns can be acquired within that correlation interval, they statistically appear as if they are time correlated, or are effectively measured at the same time.

Furthermore, embodiments of the present architecture are suitable for military applications. In some embodiments, extremely fast transmitter/receiver and polarized switches can be realized with switching time of no more than tens or hundreds of nanoseconds.

Embodiments of the inventive concepts disclosed herein can effectively acquire time coincident vertically polarized and horizontally [polarized target returns within a single channel radio frequency system by switching the transmit/receive switch 432 and/or polarization switch 442 within a time frame defined by the correlation interval. In at least one embodiment, the transmit/receive switch 432 and/or polarization switch 442 are driven by a radar processing unit clock signal. In at least one embodiment, the transmit/receive switch 432 and polarization switch 442 are driven synchronously.

In at least one embodiment, cross-polarization terms (Vertical polarization for transmission and horizontal polarization for reception, or Horizontal polarization for transmission and vertical polarization for reception) are realized with a given radar pulse epoch when the transmit/receive switch 432 and polarization switch 442 are synchronized with the radar processing unit.

Some algorithms for analyzing polarized return signals may require the polarization switch 442 to operate at the radar processing unit clock frequency, while others may require slower switching. It may be appreciated that the polarization switch 442 is addressable to switch at any desired frequency up to the maximum switching frequency of the polarization switch 442 as dictated by a desired analytical application.

Furthermore, it may be appreciated that the timed switching of the polarization switch 442 based on the frequency of the signal being transmitted or received, and while such signal is being transmitted or received, will allow for the synthesis of circular polarization by post processing the radar transmissions and received signals.

Errors in processing occur if the correlation interval is exceeded. Parametric target return analysis fundamentally assumes time coincidence for the horizontally polarized and vertically polarized return signals since differential reflectivity is a ratio of signals taken during time coincidence. The need for time coincidence historically required dual channel architectures, driving up costs. Embodiments of the present disclosure utilize a single channel for each radiating element 418 by maintaining a sufficiently short correlation interval.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A radar system comprising:
a control circuit;
a plurality of element control circuits in electronic communication with the control circuit, each comprising a transmit/receive switch and a polarization switch;
a plurality of dual orthogonal linear polarizing radiating elements, each associated with one of the plurality of element control circuits;
a controller in electronic communication with each transmit/receive switch and each polarization switch, the controller configured to:
place each radiating element in either a receive mode or a transmit mode; and
place each radiating element in either a horizontal polarization or a vertical polarization.

2. The radar system of claim 1, wherein each element control circuit and corresponding radiating element define a single radio frequency channel.

3. The radar system of claim 1, wherein each polarization switch has a switching time of less than one-hundred microseconds and more than one-hundred nanoseconds.

4. The radar system of claim 3, wherein the controller is further configured to:
identify a frequency of a signal being transmitted; and
activate the polarization switch based on the identified frequency to create a circularly polarized signal.

5. The radar system of claim 1, wherein the controller is further configured to operate each combined transmit/receive switch and polarization switch synchronously.

6. The radar system of claim 1, wherein the controller is further configured to operate a first set of element control circuits and radiating elements within the plurality of element control circuits and corresponding radiating elements in a horizontally polarized configuration and a second set of element control circuits and radiating elements within the plurality of element control circuits and corresponding radiating elements in a vertically polarized configuration simultaneously.

7. The radar system of claim 1, further comprising a radar processing unit in electronic communication with the controller, wherein the controller is configured to operate each of the polarization switches of the plurality of element control circuits according to a radar processing unit radar pulse epoch.

8. The radar system of claim 7, wherein the radar processing unit configures the controller to operate the polarization switches at variable switching times with respect to each other.

9. A method for creating and receiving dual polarized signals in a single channel comprising:
placing each radiating element in an array of dual orthogonal linear polarizing radiating elements in either a receive mode or a transmit mode via an associated transmit/receive switch particular to one of the radiating elements;
placing each radiating element in either a horizontal polarization or a vertical polarization via an associated polarization switch particular to one of the radiating elements; and
operating each of the polarization switches associated with the array of dual orthogonal linear polarizing radiating elements according to a signal from a radar processing unit to produce a desired polarized waveform.

10. The method of claim 9, wherein each transmit/receive switch, polarization switch, and corresponding radiating element define a single radio frequency channel.

11. The method of claim 9, wherein the radar antenna comprises a portion of a meteorological radar system.

12. The method of claim 11, further comprising:
identifying a frequency of a signal being transmitted; and
activating each polarization switch at intervals based on the identified frequency to create a circularly polarized signal via processing of horizontally polarized signals and vertically polarized signals generated by polarization switching.

13. The method of claim 9, further comprising operating each associated transmit/receive switch and polarization switch synchronously.

14. The method of claim 9, further comprising operating a first set of radiating elements in a horizontally polarized configuration and a second set of radiating elements in a vertically polarized configuration simultaneously.

15. The method of claim 9, further comprising:
contemporaneously receiving a horizontally polarized signal and a vertically polarized signal; and combining the horizontally polarized signal and the vertically polarized signal to produce an image.

\* \* \* \* \*